United States Patent [19]

Lawrence et al.

[11] Patent Number: 4,850,777

[45] Date of Patent: * Jul. 25, 1989

[54] QUICK-ACTION FASTENERS

[76] Inventors: Ventura A. Lawrence; Ventura J. Lawrence, both of 1903 Navy Dr., Stockton, Calif. 95206

[*] Notice: The portion of the term of this patent subsequent to Aug. 16, 2005 has been disclaimed.

[21] Appl. No.: 155,326

[22] Filed: Feb. 12, 1988

Related U.S. Application Data

[63] Continuation-in-part of Ser. No. 877,657, Jun. 23, 1986, Pat. No. 4,764,071, which is a continuation-in-part of Ser. No. 830,295, Feb. 14, 1986, abandoned.

[51] Int. Cl.[4] .................. F16B 37/08; B25G 3/00
[52] U.S. Cl. .................. 411/433; 411/935; 403/305; 403/371
[58] Field of Search ............... 411/427, 432, 433, 935; 52/704, 705; 403/314, 369, 316, 305, 371

[56] References Cited

U.S. PATENT DOCUMENTS

| | | | |
|---|---|---|---|
| 854,512 | 5/1907 | Mapes | 269/174 |
| 2,021,051 | 11/1935 | Desbrueres . | |
| 2,041,108 | 5/1936 | Becker, Sr. et al. | 403/369 |
| 2,356,014 | 8/1944 | Wade et al. | 403/316 |
| 2,463,145 | 3/1949 | Buchanan | 403/314 |
| 2,489,613 | 11/1949 | Beswick | 411/433 |
| 2,814,324 | 11/1957 | Shur | 411/935 |
| 2,896,496 | 1/1958 | Jansen . | |
| 3,119,203 | 1/1964 | Finsterwalder . | |
| 3,151,652 | 10/1964 | Zahodiakin | 411/935 |
| 3,292,337 | 12/1966 | Finsterwalder | 52/738 |
| 3,352,341 | 11/1967 | Schertz | 411/433 |
| 3,554,270 | 1/1971 | Gelfand . | |
| 3,561,185 | 2/1971 | Finsterwalder et al. | 52/737 |
| 3,694,012 | 9/1972 | Gelfand . | |
| 3,782,839 | 1/1974 | Majewski . | |
| 4,056,911 | 11/1977 | Tani | 52/738 |
| 4,083,393 | 4/1978 | Okada . | |
| 4,362,423 | 12/1982 | Miles . | |
| 4,378,187 | 3/1983 | Fullerton | 411/267 |

FOREIGN PATENT DOCUMENTS 72788 11/1947 Norway .
590430 7/1947 United Kingdom .

OTHER PUBLICATIONS

"Lenton Rebar Splicing" brochure, Erico Products, Inc.
"Rebar Flange Coupler" brochure, Williams Form Engineering Corp.
"Dowel Bar Replacement" brochure, Dayton Superior, 1983.
"Ace Allthread" sales brochure, Advanced Construction Enterprises, Simpsonville, S.C.

Primary Examiner—Neill R. Wilson
Attorney, Agent, or Firm—Townsend & Townsend

[57] ABSTRACT

Quick action fasteners, nuts, and end-to-end couplers, which eliminate the need for time-consuming and labor-intensive threading of nuts, couplers, and the like to helically threaded reinforcing rod and sections thereof and to other types of textured surface reinforcing rod, particularly in environments in which the fastener will be subjected to high loads and/or torques. Fasteners according to the invention include a housing, a plurality of nut segments, and an end cap for retaining the nut segments in a specially shaped bore defined in the housing. The bore includes a tapered section and an expansion section; the nut segments are formed, along interior segment surfaces, to be closely engageable to a corresponding section of the reinforcing rod. The nut segments are also shaped, along their exterior surfaces, to be congruent with tapered section of the bore. The nut segments are movable from locked engagement with the tapered section and the rod section to a release position in which the nut segments can be moved into the expansion section.

6 Claims, 4 Drawing Sheets

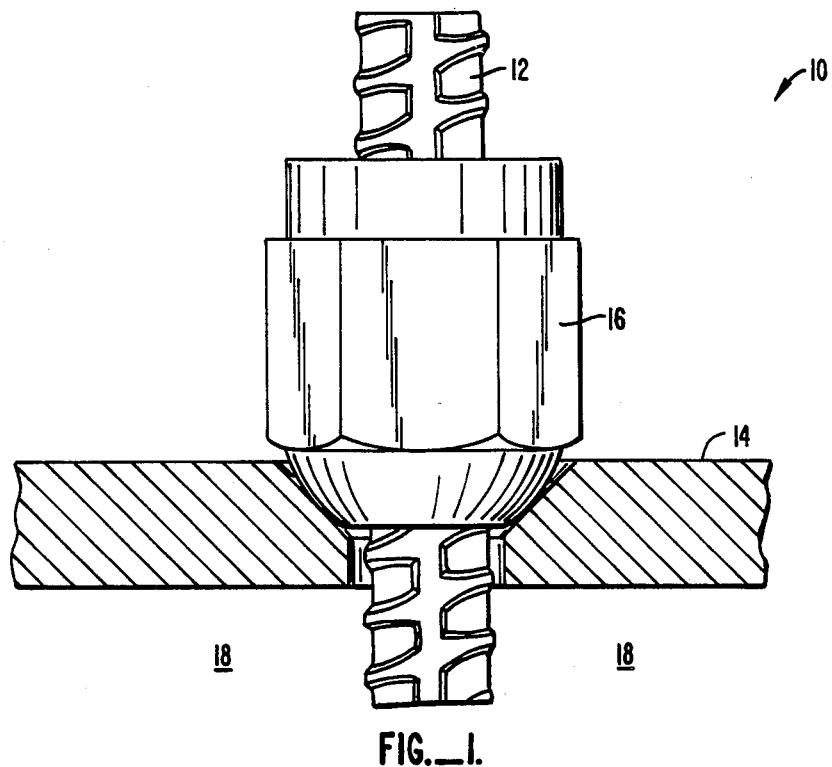
FIG.—1.
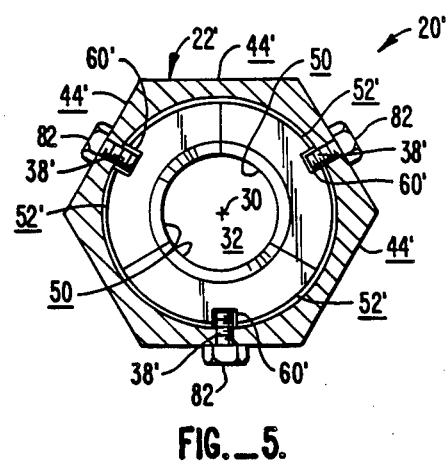
FIG.—5.

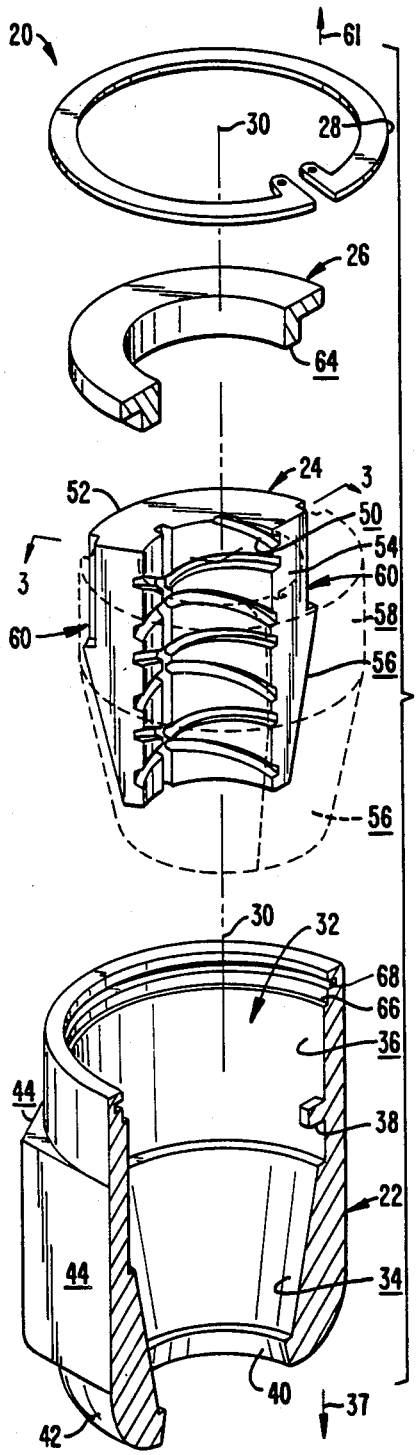
FIG._2.
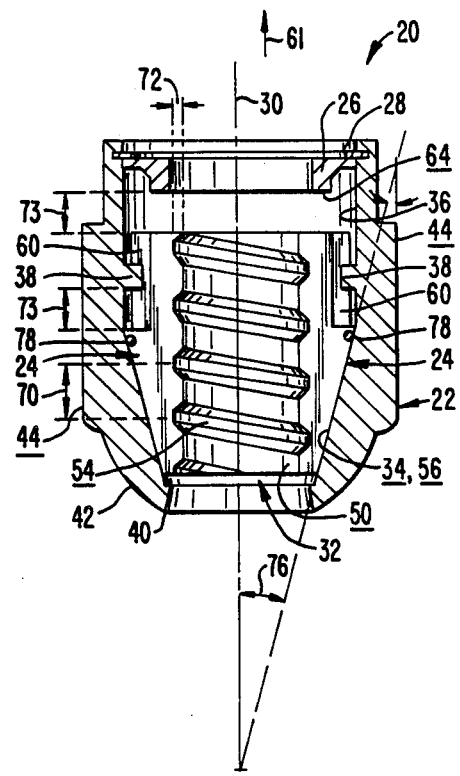
FIG._3.
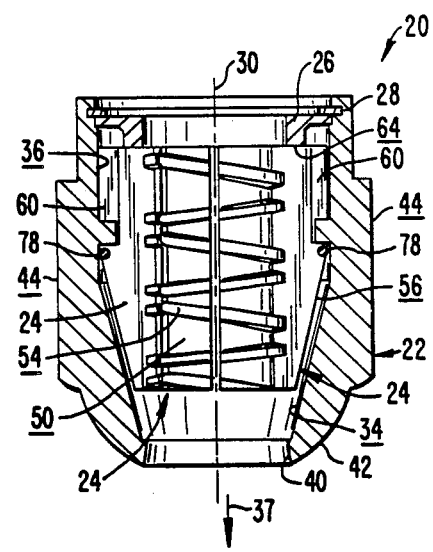
FIG._4.

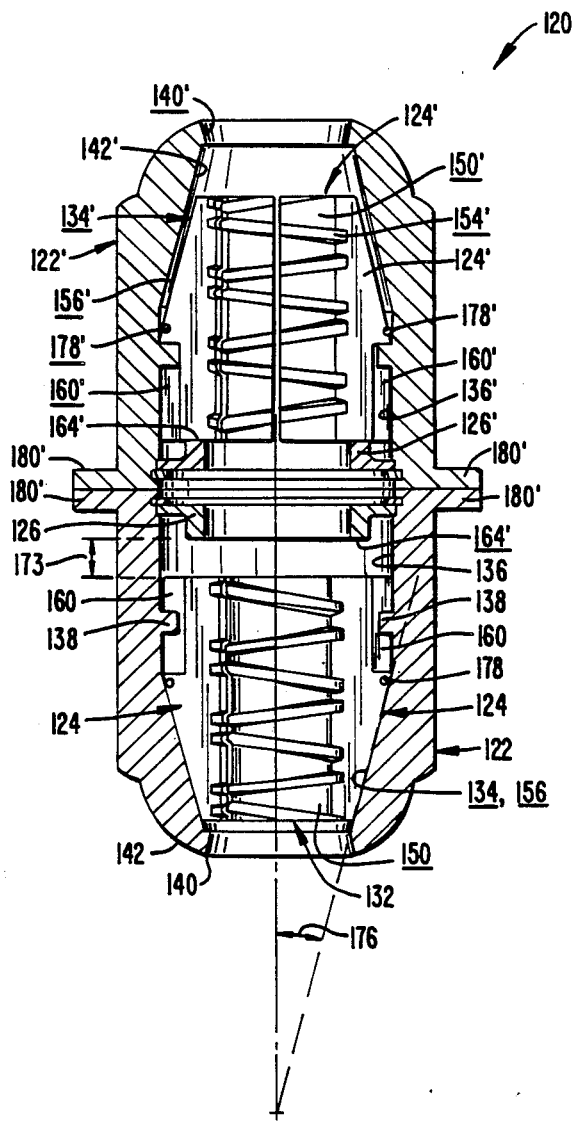
FIG._6.

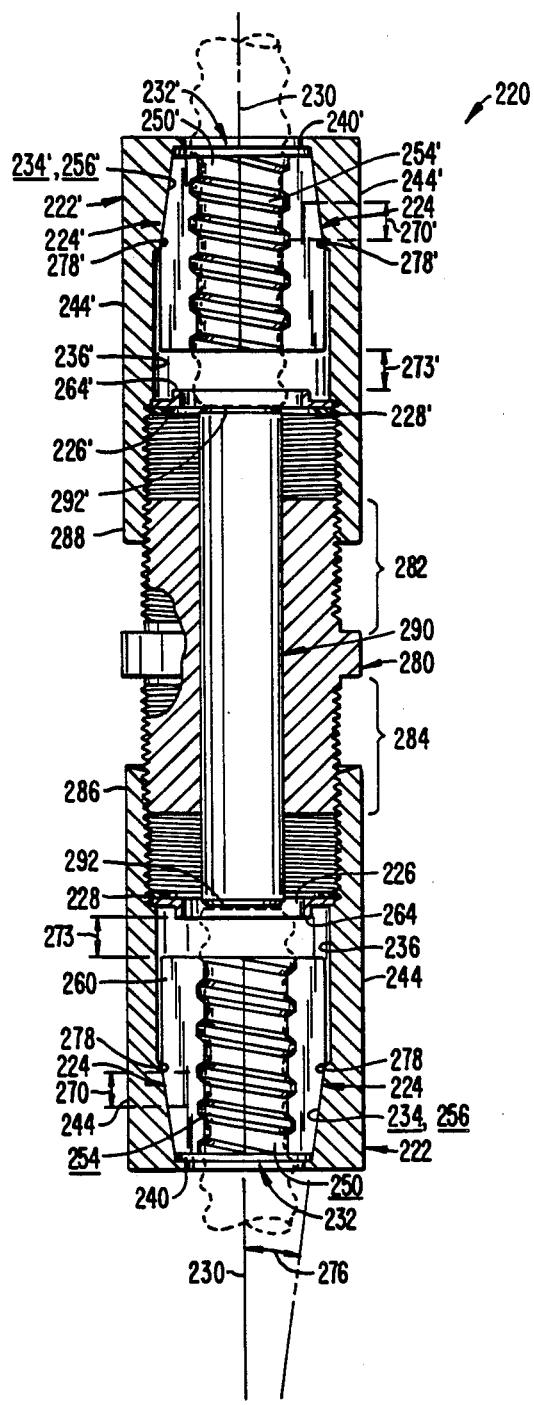
FIG._7.

QUICK-ACTION FASTENERS

This is a continuation-in-part of application Ser. No. 877,657, filed June 23, 1986 now U.S. Pat. No. 4,764,071, which is a continuation-in-part of application Ser. No. 830,295, filed Feb. 14, 1986, now abandoned.

BACKGROUND OF THE INVENTION

This invention relates to quick-action nuts, fasteners and couplers and, more particularly, to anchor nuts and couplers for fastening reinforcing rod, especially in environments in which high loads and/or torques are applied to nuts, fasteners, and couplers.

In many applications of reinforcing rod, commonly referred to as "rebar," it is desirable to have available accessories, such as nuts and couplers, with which reinforcing rods can be fastened together or to other structures. For example, reinforcing rod is often used in tunnel wall, mine, and slope stabilization and/or soil anchoring systems. The reinforcing rod is inserted and/or grouted into the rock or soil to be stabilized; an anchor plate or bearing plate is then fitted around the projecting reinforcing rod and placed against the slope or wall to be stabilized and held in position with, for example, a clamp applied to the projecting end of the reinforcing rod. While such systems are effective, their assembly is difficult due to the heavy reverse loading of the clamps, and is extremely labor intensive.

Some of these difficulties may be reduced through the employment of helically threaded reinforcing rod systems which include large, threaded "nuts" that may be screwed on to the ends of the reinforcing rod and, for example, tightened against the anchor plates. Helically threaded reinforcing rods and systems are disclosed, for example, by Finsterwalder, U.S. Pat. No. 3,292,337; Finsterwalder, et al., U.S. Pat. No. 3,561,185; and Tani, U.S. Pat. No. 4,056,911. Although such systems have greatly increased the number of applications of reinforcing rod, known nuts for use with helically threaded reinforcing rod generally have the disadvantage of requiring a great many revolutions at the nut or other fastener on the reinforcing rod before the fastener is brought into the desired, locked position on the threaded reinforcing rod. Such processes can be time consuming and inefficient.

Quick-action fasteners for screws and bolts are known. See. e.g., Okada, U.S. Pat. No. 4,083,393; Fullerton, U.S. Pat. No. 4,378,187; Beswick, Great Britain Patent No. 590,430; Schertz, U.S. Pat. No. 3,352,341; Jansen, U.S. Pat. No. 2,896,496; Desbrueres, U.S. Pat. No. 2,021,051; and Norwegian Patent No. 72,788. Heretofore known quick-action fasteners have been designed for and intended for use with relatively light-duty screws, bolts, and the like, and fail under the loading required for successful use in such high load and/or high torque environments such as those encountered in applications of reinforcing rod systems. Such known fasteners are adapted exclusively for use with helically threaded shafts and for convenient removal therefrom by a quick release mechanism or by "unscrewing." In addition, the complexity and hence manufacturing costs of known quick-action fasteners are typically quite high.

A second application in which reinforcing rods are desirably coupled together or those in which long links of reinforcing rods are necessary as, for example, large prestressed concrete platforms, walls, and the like. Since it is generally inconvenient to manufacture, ship, and/or assemble arbitrarily long lengths of reinforcing rod, it is necessary that shorter links of reinforcing rod be coupled end-to-end. The ends of the reinforcing rods may be wired together, welded together (see Gelfand, U.S. Pat. No. 3,554,270) or clamped together (see Gelfand, U.S. Pat. No. 3,694,012 and Miles, U.S. Pat. No. 4,362,423). In addition, reinforcing rods which are helically threaded over their entire lengths or over relatively short end sections may be screwed together with an appropriate fitting. See, e.g., Majewski, U.S. Pat. No. 3,782,839. Each of these known systems for coupling reinforcing rods end-to-end are labor intensive, requiring considerable manual effort to assemble, and frequently require specially manufactured, machined and/or threaded reinforcing rod. These disadvantages are particularly acute when it is desired to couple reinforcing rods end-to-end in a vertical orientation; the clamping, screwing, or other assembly operations may then have to be performed relatively high in the air. Also, the complexity and hence manufacturing costs of such systems are typically high.

SUMMARY OF THE INVENTION

Quick action fasteners are provided which eliminate the need for time-consuming and labor-intensive threading of nuts, couplers, and the like to helically threaded portions of reinforcing rod and greatly reduce the difficulty and inefficiency of clamping and coupling textured-surface reinforcing rod. The fasteners of the invention are relatively simple to manufacture and use and withstand typical loading forces of 120 tons or more.

Fasteners according to one embodiment of the invention include a housing, a plurality of nut segments, and an end cap for retaining the nut segments in a specially shaped bore defined in the housing. The bore includes a tapered section and an expansion section; the nut segments are formed, along interior segment surfaces, to be closely engageable to a section of a textured surface reinforcing rod or bolt. The nut segments are also shaped along their exterior surfaces to be congruent with the tapered section of the bore. The nut segments are movable from locked engagement with the tapered section and the rod or bolt section to a release position in which the nut segments can be moved into the expansion section to slide or "ratchet" over the surface indentations and projections of the rod or bolt.

An important feature of the fasteners according to the invention is the angle, with respect to the axis of the bore, of the taper of the tapered section and the corresponding, matching angle of tapered portions of the nut segments. The proper choice of this angle, about 9° in the preferred embodiments, enables the use of the fasteners in high-load and torque environments by ensuring even distribution of the load over the interior nut segment surfaces and, hence, the threaded rod.

Fasteners according to the invention also include limit means to prevent misalignment of the nut segments along the length of the rod. Post projecting into the expansion section into corresponding slots in the nut segments may be used as limit means; alternatively, or in combination therewith, an end cap mounted to one end of the housing may be used to limit the travel of the nut segments in the bore. In embodiments adapted for use with helically threaded reinforcing rod, the projection of the posts into the corresponding slots serve to allow these fasteners to be "unscrewed" from the helically threaded rod.

In a second embodiment of the invention, particularly adapted to couple reinforcing rod sections end-to-end, includes a housing having a through-going bore which includes a pair of generally frustoconical tapered sections and a pair of cylindrical expansion sections, a cylindrically section being adjacent or corresponding tapered section, tapered sections being generally located at opposite ends of the bore. The second embodiment according to the invention also includes a pair of pluralities of arcuate nut segments, each plurality of nut segments being mounted in a corresponding end of the bore to be disposable about an end section of one of the reinforcing rods. Each nut segment has an interior segment surface formed to define a textured surface complimentary to a corresponding portion of the textured surface of the reinforcing rod, and an exterior segment surface including a tapered portion formed to be congruent with a corresponding portion of the tapered sections of the bore. The second embodiment according to the invention also includes stops for limiting the movement of each plurality of nut segments along the bore axis. The stops may be posts projecting into each expansion section into corresponding slots in each of the pluralities of nut segments. Alternatively, or in addition, the travel of each of the pluralities of pairs of nut segments may be limited with a plate or other structure inserted through the housing between the pluralities of nut segments.

In each embodiment according to the invention, the interior surfaces of the nut segments can be formed to be complimentary to the textured surface of any reinforcing rod desired to be used. The interior nut segment surfaces may be formed to have helical threads for use with helically threaded reinforcing rod. However, the invention is not so limited, and may be adapted for use with other reinforcing rod systems having a variety of surface ribs, indentations, protrusions, and the like.

Other features and advantages of fasteners according to the invention will become apparent from the detailed description of the accompanying drawings.

BRIEF DESCRIPTION OF THE DRAWINGS

FIG. 1 is a schematic, partially cut away representation of a typical reinforcing rod application of a type with which the present invention is intended to be used.

FIG. 2 is an exploded perspective view of one embodiment of the invention, indicating two of the nut segments in phantom.

FIG. 3 is a cross-sectional view of the first embodiment of the invention, taken generally along section 3—3 of FIG. 2 and showing the nut segments in a lock position.

FIG 4 is a cross-sectional view of the first embodiment of the invention, taken generally along section 3—3 of FIG. 2 and showing the nut segments in a release position.

FIG. 5 is a cross-sectional view of a modification of the first embodiment of the invention taken generally normal to the bore axis.

FIG. 6 is a cross-sectional view of a second embodiment of the invention taken generally normal to the bore axis.

FIG. 7 is a cross-sectional view of a variation of the second embodiment of the invention taken generally normal to the bore axis.

DETAILED DESCRIPTION OF THE SPECIFIC EMBODIMENT

A typical system 10 of a type with which the present invention may be used is shown schematically in FIG. 1. System 10 includes a reinforcing rod 12, an anchor plate 14 and a helically threaded anchor nut 16 The system 10 shown in FIG. 1 is intended for use with grouting concrete, etc, in the region numbered 18, for reinforcing rock or dirt slopes and walls. Such systems 10 typically may also provide for the use of various bearing plates, washers, couplers (for splicing reinforcing rods end-to-end. e.g.), and the like.

One quick-action fastener 20 according to the invention, shown as adapted for use in a reinforcing rod system such as system 10, is shown in exploded perspective view in FIG. 2. and in cross-section in FIGS. 3 and 4. Fastener 20 generally includes a housing 22, a plurality of nut segments 24, an end cap 26, and a snap ring 28.

Housing 22 includes, along a bore axis 30, a throughgoing bore 32. Throughgoing bore 32 in housing 22 includes a tapered section 34 and an expansion section 36. Tapered section 34 has a generally frustoconical shape narrowing in a direction along bore axis 30 opposite the direction of the primary load on fastener 20 (the "forward direction" 37). Expansion section 36 is conveniently made cylindrical with a diameter at least as large as and preferably larger than, the largest diameter of tapered section 34. The precise dimensions and shape of expansion section 36 will be dependent upon the corresponding dimensions of nut segments 24 and other factors to be discussed below. Housing 22 is provided with a plurality of posts 38 projecting, in the preferred embodiment, inwardly of expansion section 36.

In fastener 20, housing 22 is provided with a pilot flange 30 at one end; typically, pilot flange 40 is frustoconical in shape having a taper in a direction opposite of that of tapered section 34, and serves the function of guiding the insertion of a reinforcing rod into bore 32.

The exterior surface of housing 22 may be formed to have a variety of shapes, depending upon the particular purpose for which a particular fastener 20 is intended. In the embodiment shown in FIGS. 2-4, housing 22 includes a generally spherical anchor section 42 for matingly engaging with a corresponding anchor plate, e.g., anchor plate 14 of FIG. 1. Housing 22 also includes, in the preferred embodiment, a plurality of tool engagement surfaces 44; in the embodiment shown in FIGS. 2-4, tool engagement surfaces 44 comprise opposing pairs of mutually parallel flat surfaces for engagement of, e.g., a wrench, with fastener 20.

Nut segments 24 are typically arcuate as shown in FIG. 2 and include, on the sides of nut segments 24 adjacent bore axis 30, interior segment surfaces 50 and, distal bore axis 30, exterior segments surfaces 52. Interior segment surfaces 50 are formed to have textured surfaces 54 to be complimentary to, and matingly engageable with the corresponding surface texture of the particular type of reinforcing rod, e.g., reinforcing rod 12 of FIG. 1. Exterior segment surfaces 52 include tapered portions 56 and upper portions 58. Tapered portions 56 will be congruent to a corresponding portion of tapered section 34; preferably, the length of tapered portions 56 along bore axis 30 will be somewhat less than the corresponding length of tapered section 34 such that, when nut segments 24 are mutually aligned against tapered section 34, the extension of nut segments 24 in forward direction 37 is somewhat less than that of tapered section 34, as shown most clearly in FIG. 3. Such a choice is preferred to prevent possible inward distortion of the lower ends of nut segments 24 toward the reinforcing rod which would thereby weaken fastener 20 and hence its engagement to the reinforcing rod, and also tend to cut into and thereby weaken the reinforcing rod. Preferably, nut segments 24 are formed to extend, in forward direction 37, about 0.018 inches or more less than tapered section 34, so that under a typical load of about 120 tons or more, nut segments 24 are not forced beyond tapered section 34 in forward direction 37.

Textured surfaces 54 of the individual nut segments 24 will generally be somewhat different but will be chosen to form, when nut segments 24 are mutually aligned in contact, indentations and protrusions generally corresponding to those of a corresponding section of the reinforcing rod.

In some embodiments nut segments 24 will be formed to have, in upper portions 58, a plurality of slots 60. Slots 60 will be oriented generally axially, approximately parallel to bore axis 30, and positioned to engage with corresponding posts 38. The lengths of slots 60 will be chosen such that the ends of slots 60 adjacent tapered portions 56 engage posts 38 to limit the motion of nut segments 24 along bore axis 30 in a direction away from tapered section 34, in a "reverse direction" 61.

End cap 26 serves to retain nut segments 24 within bore 32 and includes a rod insertion hole 62 for limiting, in some embodiments, the movement of nut segments 24 along bore axis 30. End cap 26 is fixedly engageable to housing 22 in any of a variety of ways. In the embodiment shown in FIGS. 2–4, end cap 26 is formed to mate with a corresponding ledge 66 formed in one end of bore 32 of housing 22. In this embodiment, end cap 26 is retained against ledge 66 with a snap ring 28 which is engageable to a corresponding snap ring groove 68 in housing 22.

Nut segments 24 are formed, in cooperation with bore 32, to be freely movable between a locked position shown in FIG. 3 to a release position shown in FIG. 4. In the locked position, tapered portions 56 engage tapered section 34 and nut segments 24 are mutually aligned along bore axis 3 to closely circumscribe a reinforcing rod section (not shown in FIGS. 3 and 4). In the locked position, nut segments 24 mutually engage under a typical load in reverse direction 61 of about 120 tons to closely encircle the threaded rod section to within a clearance of less than about 1/32 of an inch (less than 1 mm). When the load is applied to fastener 20 generally along bore axis 30 in reverse direction 61, nut segments 24 cooperate with tapered section 34 of housing 22 to prevent movement of fastener 20 in reverse direction 61 and fixedly grasp the reinforcing rod.

In the release position, shown in FIG. 4, nut segments 24 are disengaged from tapered section 34 toward reverse direction 61 into expansion section 36. The allowed travel 73 of nut segments 24 within bore 32 into expansion section 36 along bore axis 30 is, in the embodiment shown in FIG. 4, limited both by the engagement of posts 38 with the corresponding ends of slots 60 and by the engagement of nut segments 24 with lower surface 64. In alternate embodiments, the limit of travel 73 of nut segments 24 could be defined either by the engagement of posts 38 with the ends of slots 60 or by the engagement of nut segments 24 with lower surface 64. The dimensions, e.g., travel 73, of expansion section 36 are chosen to allow sufficient upward travel of nut segments 24 within bore 32 to disengage tapered portions 56 from tapered section 34 and to allow radial movement of individual nut segments 24 away from bore axis 30, thus allowing the reinforcing rod to slip through bore 32. The dimension of expansion section 36 along bore axis 30 is not critical; however, travel 73 of nut segments 24 within bore 32 toward end cap 26, must be sufficiently small that the possibility of mutual misalignment of nut segments 24 along bore axis 30 is eliminated. If, e.g., one of nut segments 24 were separated, in the locked position, from the remaining nut segments 24 along bore axis 30 by a significant distance, the load on fastener 20 in the locked position would be unevenly applied to the threaded rod, risking failure of fastener 20, For example, in FIG. 3, interior segment surfaces 50 are shown to be complimentary to the exterior surface of a helically threaded reinforcing rod. Interior segment surfaces 50 are thus formed to have helical indentations with a pitch 70 and a thread height 72 substantially equal to the corresponding pitch in thread height of the helically threaded reinforcing rod to be used. In such an embodiment of the invention, the stops limit travel 73 of nut segments 24 to an amount less than pitch 70 and thus maintain the mutual alignment of nut segments 24. The "stop" function is performed, in the embodiment shown in FIG. 3 by the engagement of posts 38 with the ends of slots 60 and/or the location of lower surface 64. In alternate embodiments having differently formed interior segment surfaces 50 for use with other types of textured reinforcing rod, analogous considerations will govern the distance over which nut segments 24 are allowed to travel.

Tapered section 34 and tapered portions 56 of nut segment 24 are each aligned, with respect to bore axis 30, by a taper angle 76; taper angle 76 is critical in high load and/or torque applications. Under typical loads in reverse direction 61 ("reverse loads") encountered with the use of fastener 20 with helically threaded rods of 120 tons or more, if taper angle 76 is too large (greater than about 15°), the load will not be distributed evenly over the length of interior segment surfaces 50, but will be concentrated in the region of tapered portions 56. This may lead to overcompression of the reinforcing rod in this region and/or failure of fastener 20 under typical reverse loads. Similarly, if taper angle 76 is chosen to be too small (less than about 6°), the loading of fastener 20 will again be concentrated in the region of tapered portions 56 and upper portions 58 will tend to "bow" away from bore axis 30, again leading to failure of fastener 20. Satisfactory distribution of the reverse load along the length of nut segments 24 is obtained with a taper angle 76 in the range of about 7° to about 12°. Preferably, taper angle 76 is about 9° for a threaded rod diameter of about 1.5 in., a length of taper portions 56 of about 1.5 in., and a total nut segment length (along bore axis 30) of about 2.5 in.

In some embodiments, it is convenient to include an o-ring 78 or other suitable elastic expansion means around nut segments 24 to provide a small bias of nut segments 24 inward from their respective release positions to the mutually aligned lock positions. Such an o-ring 78 will be mounted in a suitable groove inscribed in exterior segment surfaces 52. O-ring 78 will be resilient, but sufficiently expansible to allow nut segments to readily move radially outward into expansion section 36.

In those embodiments of the invention for use with helically threaded reinforcing rod, posts 38, by their engagement with slots 60, also serve to allow fastener 20 to be disengaged from the threaded rod by turning fastener 20 with a tool or other wrench in a direction counter to the thread direction of the threaded rod. That is as fastener 20 is turned in such a manner, posts 38 engage slots 60 to transmit the force applied to tool engagement surfaces 44 to nut segments 24, allowing the disassembly, by "unscrewing" fastener 20 from the threaded rod.

Although the operation of fastener 20 will be apparent to those skilled in the art from the above description, the operation of fastener 20 will now be outlined in more detail. With the reinforcing rod oriented in the desired position and location, one end of the reinforcing rod is inserted into bore 32, in some embodiments guided with pilot flange 40. As the threaded rod is inserted into bore 32, nut segments 24 will be forced toward reverse direction 61 where nut segments 24 will be moved outward radially by engagement with the reinforcing rod and thereby allow passage of the reinforcing rod past thread surfaces 54 of nut segments 24. When fastener 20 is in the desired position, fastener 20 is reverse-loaded to force nut segments 24 into the locked position and thereby engage textured surfaces 54 to the desired location of the reinforcing rod. Reverse loading can be accomplished in various ways, depending on the particular application of fasteners 20. For example, in situations in which the reinforcing rod system 10 is being used to anchor soil in conjunction with, e.g., grouting or other anchoring systems, an impact force, e,g., a hammer blow, may be applied to the end of the threaded rod to urge the reinforcing rod opposite the direction of insertion of fastener 20 and thereby force, e.g., anchor section 42, against a suitable anchor plate, e.g., 14 (FIG. 1). In some applications, such as reinforcing rod systems, the reinforcing rod will be prestressed.

In those embodiments of the invention adapted for use with helically threaded reinforcing rod, fastener 20 can be turned using tool engagement surfaces 44 to fully engage fastener 20. In such embodiments, fastener 20 can be disengaged from the (threaded) reinforcing rod by "unscrewing" fastener 20 along the entire projecting length of the reinforcing rod using, e.g., tool engagement surfaces 44. In other embodiments of the invention, it will not in general be possible to easily remove fastener 20 from reinforcing rod having different textured surfaces. However, in many applications this will not be a significant disadvantage since the positioning of fastener 20 is intended to be relatively permanent.

The orientation of the reinforcing rod is not critical to the successful use of the invention; if the threaded rod is oriented to extend upward from e.g., a slope or wall to be reinforced, fastener 20 will typically drop to the desired position by its own weight under the force of gravity. In other orientations of reinforcing rod, it may be necessary to move fastener 20 along the length of the threaded rod by hand. Such an operation is easily accomplished.

The material from which the components of fastener 20 are made is not critical; however, the material must be one which is capable of withstanding the forces to be applied to fastener 20 without significant distortion. One suitable material is number 4130 alloy steel.

A modification 20' of fastener 20 is shown in cross-section in FIG. 5; the view of FIG. 5 is generally perpendicular to bore axis 30. In modification 20', slots 60' are formed near the respective centers of exterior segments surfaces 52', rather than, as indicated in FIG. 2, at the extrema of exterior segment surfaces 52. In modification 20', posts 38' are formed with a plurality of screws 82, e.g., set screws or the like, mounted in threaded holes in housing 22' to extend into expansion section 36'.

Fastener 20 can be manufactured by any number of processes known to those skilled in the art, For example, the various parts of fastener 20 could be machined. forged, cast, or the like.

Although fasteners 20, 20' shown in FIGS. 2–5 each have three nut segments 24, other numbers of nut segments are possible; a corresponding number of slots 60 and posts 38 will then be used. However, the use of three nut segments 24 is preferred, as the distribution of the required reverse loads on the reinforcing rod is more easily obtained with three nut segments 24 than with, e.g., four or more nut segments 24. Similarly, while two nut segments 24 could be used in alternate embodiments of the invention, in order to provide sufficient space in expansion section 36 for textured surfaces 54 to clear the reinforcing rod, the dimensions of expansion section 36 would be correspondingly larger due to the greater curvature of textured surfaces 54.

A second embodiment according to the invention is shown in cross-sectional view in FIG. 6; this embodiment is a coupler for coupling pairs of reinforcing rod sections together end-to-end and is generally denoted coupler 120. Coupler 120 includes, generally, a pair of fasteners similar to fastener 20 in a mutually affixed end-to-end arrangement. In FIG. 6, the elements corresponding to the pair of fasteners 20 are numbered to correspond to the numbers of analogous elements of FIGS. 1 to 5. although increased by one hundred. The portions of coupler 120 analogous to one fastener 20, in a lock position, are indicated with unprimed numbers in FIG. 6; the elements corresponding to the other of the fasteners 20, in a release position, are indicated with primed numbers. One arrangement for assembling coupler 120 and fastening the two halves of coupler 120 together is also indicated in FIG. 6. In this embodiment of coupler 120, housings 122, 122' are provided with flanges 180, 180' extending outward thereof. After insertion of nut segments 124, 124' into the corresponding ends of housing 122, 122' and insertion of end caps 126, 126' flanges 180, 180' may be fixedly connected as with bolts or other fasteners or by welding. Alternatively, housings 122, 122' could be formed in a single unitary piece. To prevent excessive travel of nut segments 124, 124', a stop such as bolts or one or more plates 126, 126', for example, could be inserted through appropriately positioned holes in or welded to housing 122, 122', to separate the two pluralities of nut segments for maintaining the pluralities of nut segments 124, 124' in their appropriate locations. Such bolts or plates 126, 126', could have the additional advantage of then preventing passage of one end of one reinforcing rod into the portion of bore 132 intended for the end of the other pair of reinforcing rods.

One end of each of the pair of reinforcing rods could be inserted into one corresponding end of coupler 120, where the reinforcing rods would then be held in the desired positions prior to, for example. reverse loading of the coupler 120 or embedding of the reinforcing rods, with coupler 120, in concrete.

A variation of the above-described coupler 120, designated coupler 220, is shown in cross-section view in FIG. 7. As with coupler 120, coupler 220 includes, generally. a pair of fasteners 222, 222' similar to fasteners 20 mountable together in a mutual end-to-end arrangement. In FIG. 7, the elements corresponding to the pair of fasteners 20 are numbered to correspond to the analogous elements of FIGS. 1 to 5, and particularly FIG. 3, although increased by two hundred. By analogy to FIG. 6, the elements of coupler 220 corresponding to the two fasteners 20 are denoted by primed and unprimed numbers. This variation of the second embodiment according to the invention is adapted to receive and couple pairs of helically threaded reinforcing rods, as indicated by the helical thread accommodating surfaces 254, 254' of the two pairs of pluralities of nut segments 224, 224'. This, as well as other embodiments of the invention, may be adapted to essentially any desired thread type or standard. Coupler 220 does not include features analogous to posts 38 and slots 60; rather plates 226, 226', which are held in place by retaining rings 228, 228', serve to limit the motion of nut segments 222, 222' within bores 232, 232'. It is not necessary. in this embodiment of the invention, to prevent movement of nut segments 222. 222' about bore axis 230. In addition, coupler 220 does not have anchor sections analogous to anchor sections 42.

Coupler 220 includes a threaded collet 280 and a positioner bar 290. Collet 280 is hollow (along bore axis 230) to loosely accommodate position bar 290 near the center thereof, and is formed, at the respective ends of collet 280, to have threaded sections 282 and 284. Threaded sections 282 and 284 have opposite thread directions, i.e.. one of threaded sections 282, 284 has right-handed threads, while the other of threaded sections 282, 284 has left handed threads. Fasteners 222, 222' are provided with threaded ends 286, 288 formed to have threads to engage the respective threaded sections 282, 284, i.e. threaded ends 286, 288 also are relatively reversing threaded.

Positioner bar 290, typically cylindrical, is sized to slide within and be somewhat longer than collet 280. Positioner bar 290 serves to engage, hold apart, and, after assembly, reverse-load the pair of reinforcing rods against fasteners 222, 222'.

Coupler 220 is utilized by loosely assembling fasteners 222, 222', collet 280, and positioner bar 290. The ends of a pair of helically threaded reinforcing rods are then inserted into the respective fasteners 222, 222', generally along bore axis 230, to abut the respective ends of positioner bar 290. The entire assembly is then tightened by rotating fasteners 222, 222' in the same direction with respect to collet 280. This action clamps the respective reinforcing rods together and seats the nut segments 224, 224' between the reinforcing rods and tapered sections 234, 234', quickly, conveniently, and firmly coupling the reinforcing rods end-to-end.

In addition, fasteners according to the present invention and constructed according to similar principles could be used for coupling pairs of reinforcing rod sections together at an angle with respect to each other.

While the above is a complete description of the preferred embodiments in the invention, other arrangements and equivalents are possible and may be employed without departing from the spirit and scope of the invention. For example other variations in the size or shape of the present invention will be readily apparent to those skilled in the art. The dimensions of fastener 20 may be readily changed proportionately for use with reinforcing rods of various diameters. The materials and dimensions utilized in the preferred fastener may be varied, depending upon manufacturing requirements and the desired characteristics of the finished fastener. Therefore, the description and illustrations should not be construed as limiting the scope of the invention, which is delineated by the appended claims.

We claim:

1. A quick action end-to-end fastener for coupling a pair of reinforcing rods end-to-end, the fastener comprising:
   a pair of housings defined, along a bore axis, a throughgoing bore, each housing including a generally frustoconical tapered section and cylindrical expansion section, each cylindrical section being adjacent the corresponding tapered section, the tapered sections being generally located at opposing ends of the bore;
   a pair of pluralities of arcuate nut segments, each plurality of nut segments being mounted in the bore, adjacent an end thereof, to be disposed about an end section of one of the reinforcing rods, each nut segment having an interior and an exterior segment surface,
   the interior segment surface being formed to define a textured surface matingly engageable to a corresponding portion of the reinforcing rod, and
   the exterior segment surface including a tapered portion formed to have a shape congruent with a corresponding portion of the tapered sections and an upper portion; and
   limit means for limiting the movement of each plurality of nut segments along the bore axis in the direction of the corresponding expansion section;
   a collet having first and second threaded sections at the respective ends thereof, the first and second threaded sections being formed to have threads of mutually opposite handedness;
   wherein each housing includes, near one end of the corresponding cylindrical section, a threaded end having threads formed therein to matingly engage one of the respective threaded sections, and
   wherein each plurality of nut segments is movable between a locking position in which the tapered portions engage the corresponding tapered section and the textured surfaces are engageable, over substantially the whole thereof, to the end section of the corresponding reinforcing rod to substantially prevent movement of the fastener relative to the corresponding reinforcing rod, and a second position in which the tapered portions are disengaged from the corresponding tapered section and the textured surfaces are disengageable from the end section of the corresponding reinforcing rod to allow movement of the fastener relative to the corresponding reinforcing rod.

2. The fastener of claim 1 wherein the limit means comprises a plate positioned interiorly of the bore between the ones of the pair of pluralities of nut segments.

3. The fastener of claim 1 adapted to fasten helically threaded reinforcing rods and wherein the interior segment surfaces are formed to define corresponding thread surfaces.

4. The fastener of claim 1:
   wherein the collet defines a hollow along the bore axis; and
   further comprising a positioner bar sized to be slidably located within the hollow and to abut the respective ends of the pair of reinforcing rods.

5. The fastener of claim 1 wherein the tapered sections have surfaces inclined at a taper angle of between about 7° and about 12° relative to the bore axis.

6. The fastener of claim 5 wherein the taper angle is about 9°.

* * * * *